(12) United States Patent
Chaseateau

(10) Patent No.: US 7,513,511 B2
(45) Date of Patent: Apr. 7, 2009

(54) CONVERTIBLE DOLLY/TABLE

(76) Inventor: Frehause A. Chaseateau, 2609 N. 74th Ct., Elmwood Park, IL (US) 60707

( * ) Notice: Subject to any disclaimer, the term of this patent is extended or adjusted under 35 U.S.C. 154(b) by 189 days.

(21) Appl. No.: 11/646,492

(22) Filed: Dec. 28, 2006

(65) Prior Publication Data
US 2007/0152412 A1 Jul. 5, 2007

Related U.S. Application Data

(60) Provisional application No. 60/755,774, filed on Jan. 4, 2006.

(51) Int. Cl.
B62B 1/12 (2006.01)
B62B 1/04 (2006.01)

(52) U.S. Cl. .......... 280/47.27; 280/659; 280/43.1; 280/43.11; 280/47.131; 280/47.17; 280/47.18; 280/47.24; 280/47.26; 280/47.315; 280/79.11; 280/47.28; 280/47.29; 280/47.34; 280/47.35; 280/47.371

(58) Field of Classification Search .......... 280/47.27, 280/659, 43.1, 43.11, 47.131, 47.17, 47.18, 280/47.24, 47.26, 47.315, 79.11, 47.28, 47.29, 280/47.34, 47.35, 47.371
See application file for complete search history.

(56) References Cited

U.S. PATENT DOCUMENTS

| | | | | |
|---|---|---|---|---|
| 3,064,989 A | * | 11/1962 | Bellows | 280/641 |
| 4,358,124 A | * | 11/1982 | Geschwender | 280/47.18 |
| 4,637,626 A | * | 1/1987 | Foss et al. | 280/655 |
| 5,228,716 A | | 7/1993 | Dahl | |
| 5,257,892 A | * | 11/1993 | Branch | 414/490 |
| 5,476,282 A | * | 12/1995 | Dahl | 280/651 |
| 5,536,034 A | * | 7/1996 | Miller | 280/651 |
| 5,772,236 A | * | 6/1998 | Clark | 280/651 |
| D417,054 S | | 11/1999 | Dziengielewski | |
| 6,019,381 A | * | 2/2000 | Krawczyk | 280/47.18 |
| 6,079,941 A | * | 6/2000 | Lee | 414/812 |
| 6,308,967 B1 | * | 10/2001 | Stallbaumer et al. | 280/47.18 |
| 6,328,319 B1 | * | 12/2001 | Stahler, Sr. | 280/47.18 |
| 6,364,328 B1 | * | 4/2002 | Stahler, Sr. | 280/47.18 |
| 6,419,244 B2 | * | 7/2002 | Meabon | 280/47.27 |
| 6,588,775 B2 | * | 7/2003 | Malone, Jr. | 280/47.18 |
| 6,929,250 B2 | * | 8/2005 | Blake et al. | 254/122 |
| 6,938,905 B1 | * | 9/2005 | Tsai | 280/47.29 |
| 7,195,255 B1 | * | 3/2007 | Tsai | 280/47.29 |
| 7,377,525 B1 | * | 5/2008 | Whitmore | 280/47.34 |
| 2001/0011802 A1 | * | 8/2001 | Meabon | 280/47.18 |
| 2002/0105169 A1 | | 8/2002 | Dahl | |
| 2003/0038007 A1 | * | 2/2003 | Han | 190/115 |
| 2004/0140638 A1 | * | 7/2004 | Celli | 280/47.18 |

* cited by examiner

Primary Examiner—Christopher P Ellis
Assistant Examiner—Jacob Meyer
(74) Attorney, Agent, or Firm—Richard C. Litman

(57) ABSTRACT

A three-in-one transporting device. The device may be converted for use as a two-wheeled dolly, a four-wheeled, flat-bed truck or a standard display table. The device incorporates a design that utilizes a lightweight frame fabricated from tubular materials. The frame has vertically and horizontally extending sockets for receiving tubular leg and handle structures to selectively form the desired devices.

18 Claims, 5 Drawing Sheets

CONVERTIBLE DOLLY/TABLE

CROSS-REFERENCE TO RELATED APPLICATION

This application claims the benefit of U.S. Provisional Patent Application Ser. No. 60/755,774, filed Jan. 4, 2006.

BACKGROUND OF THE INVENTION

1. Field of the Invention

The present invention generally relates to material transporting and display devices. More specifically, the present invention is drawn to a multi-purpose device that can be utilized as a two-wheeled dolly, a four-wheeled, flat-bed truck or a display table.

2. Description of the Related Art

Schools, hotels, restaurants, caterers, medical facilities, shipping companies—the list is endless—all must utilize devices to aid in the movement of items that otherwise would be too heavy or unwieldy to move. Conventionally, either a dolly or flat-bed truck has been employed to accomplish these tasks. Sometimes a dolly is best suited for the task. At other times, a flat-bed truck would be more appropriate. Having both these devices on hand entails the use of needed storage space and also requires the investment of capital for two transporting devices. It would certainly be convenient if both these transporting devices were available in a single entity for conversion from one device to the other. But wait!! What if this entity could also be converted to a display table? Such a device would surely be a welcome addition to the art.

The related art is rife with convertible transporting devices. Pertinent examples of such related art are cited and identified in the accompanying IDS. However, none of the cited and identified related art discloses a convertible, item-transporting device as will subsequently be described and claimed in the instant invention.

SUMMARY OF THE INVENTION

The present invention is a three-in-one transporting device. The device may be converted for use as a two-wheeled dolly, a four-wheeled flat-bed truck or a standard display table. The device incorporates a design that utilizes a light-weight frame fabricated from tubular materials. The frame has vertically and horizontally extending sockets for receiving tubular leg and handle structures to selectively form the desired devices.

Accordingly, the invention presents a transporting device that can be converted into one of three structures as desired. The device is fabricated from strong, light-weight materials that are designed to effect quick and easy conversion from one device to another. The invention provides for improved elements thereof in an arrangement for the purposes described that are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
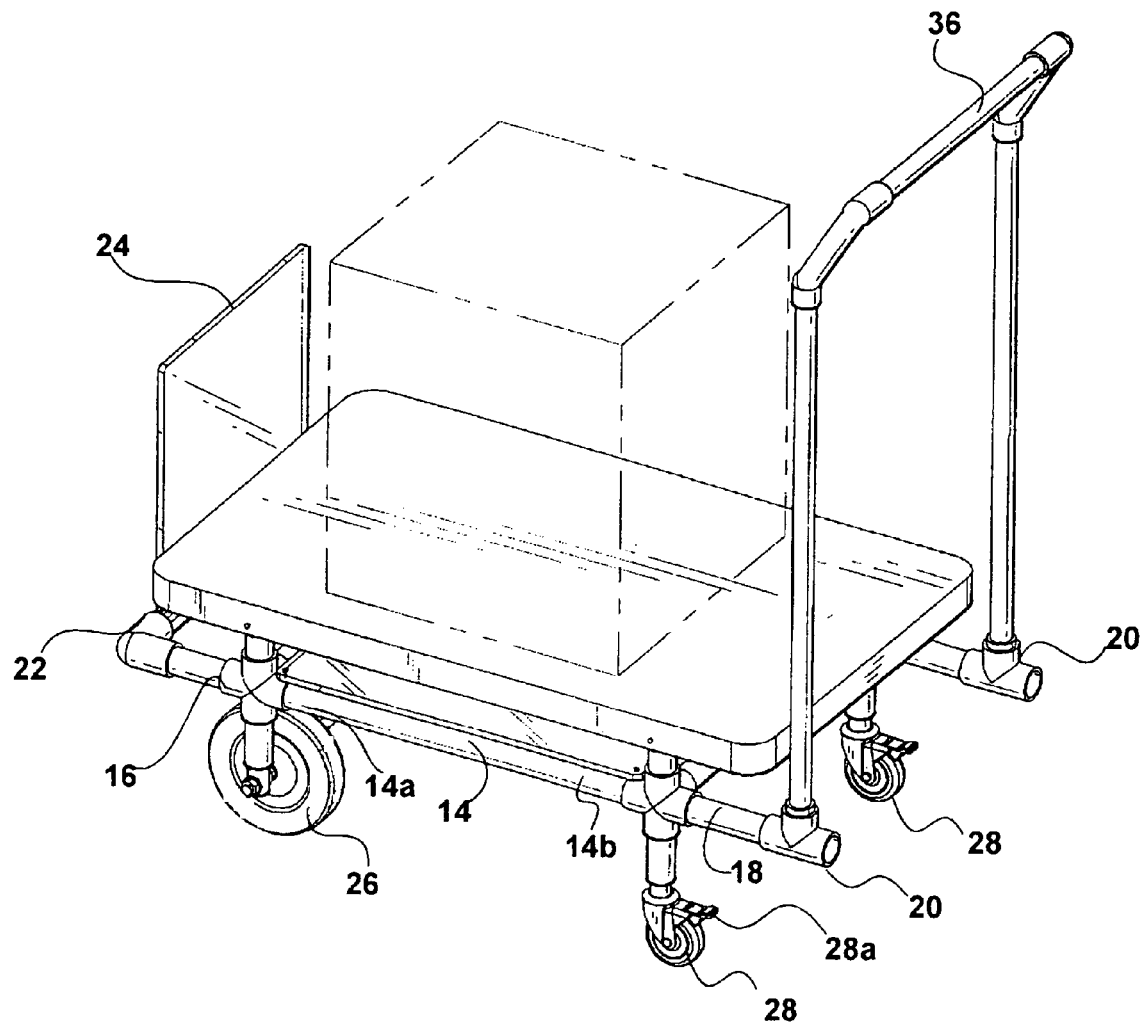
FIG. 1 is an environmental, perspective view of a convertible device utilized as a flat-bed truck according to the present invention.
Figure 2:
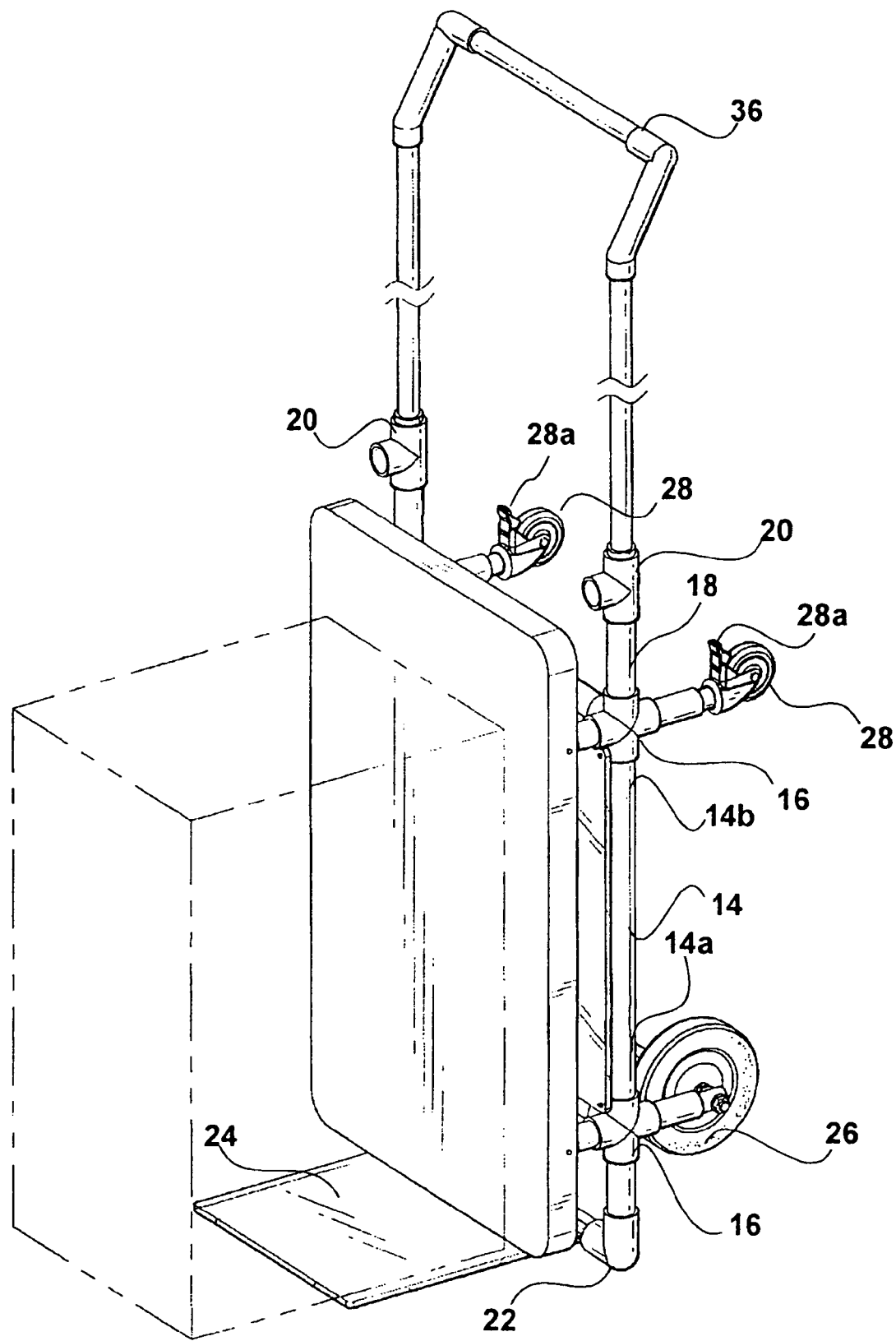
FIG. 2 is an environmental, perspective view of a convertible device utilized as a dolly truck according to the present invention.
Figure 3:
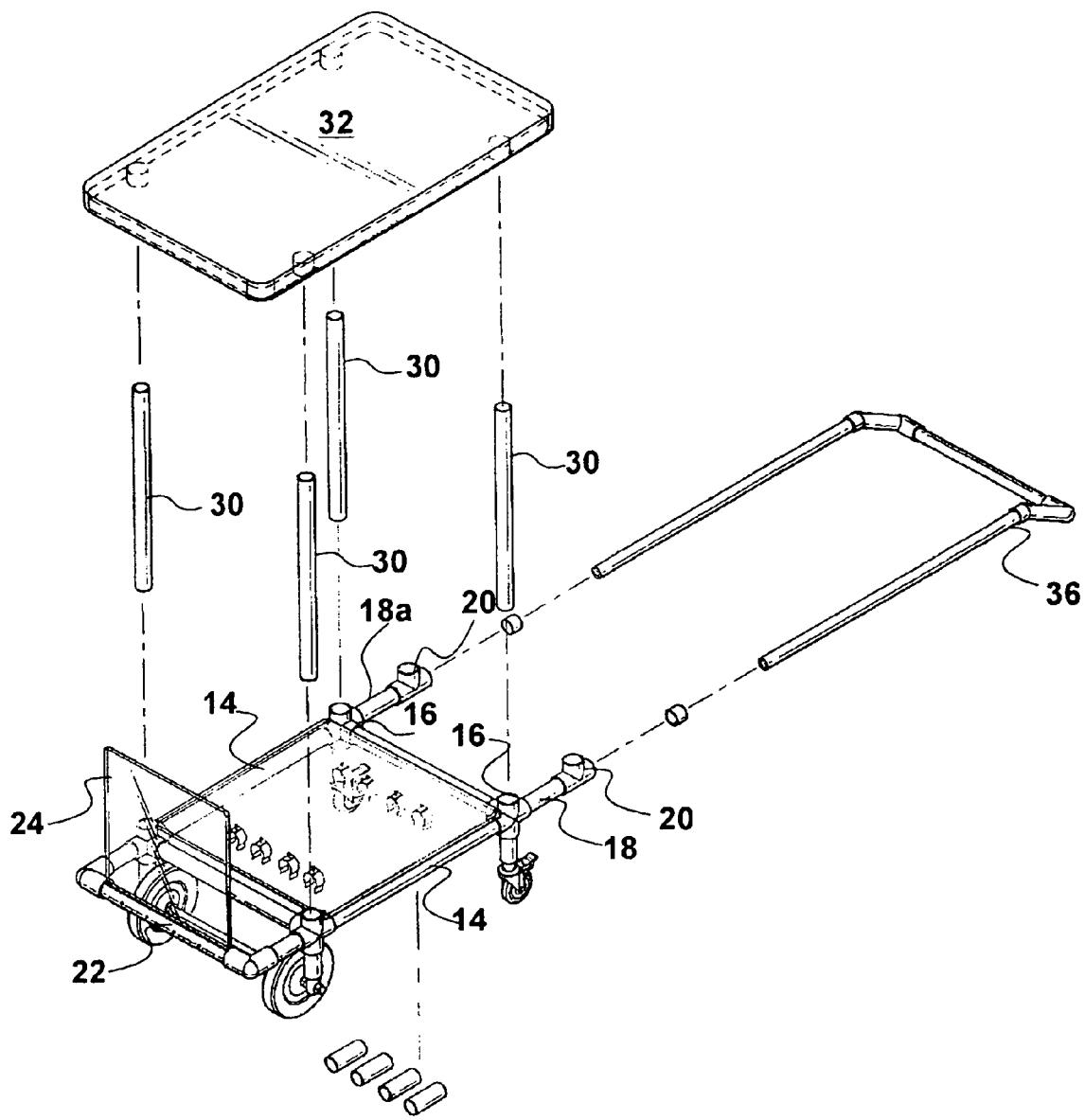
FIG. 3 is an exploded view of a convertible device according to the present invention.

Attention is first directed to FIGS. 1 through 3 wherein the device is generally indicated at 10 and is illustrated its flat-bed truck or dolly modes. The device consists of a main frame, which frame comprises two side members 14, each side member having a rear end 14a and a front end 14b. Each side member 14 has a respective socket member 16 disposed at each end. Each socket member 16 is provided with four receiving sockets (two sockets being horizontal and two sockets being vertical when the frame is in a horizontal position). One horizontal receiving socket on each member 16 receives a respective end of each side member. At each front end, the remaining horizontal socket receives a first end of a respective short tubular extension 18, 18a. A respective three-way receiving socket member 20 is positioned at the second end of each tubular extension 18, 18a. At each rear end each remaining horizontal socket receives an end of support member 22. Support member 22 includes load support member 24 having a planar support surface.

Each member 16 at the rear end is provided with a wheel 26 received in a vertical socket. Each member 16 at the front end is provided with a wheel 28 received in a vertical socket. Wheels 26 are pneumatic for facilitated movement and durability. Wheels 28 are fabricated from soft rubber and are equipped with releasable brakes 28a to afford stability and prevent unwanted motion. Wheels 26 and 28 are recessed slightly inside the perimeter of the frame for reasons as will be explained below.

Tubular members 30 extend from the vertical socket of members 16 opposite the vertical socket members employed for the wheels 26, 28. Tubular members 30 provide means for attaching a support bed 32 to the frame. Support bed 32 has a planar support surface that is perpendicular to the planar support surface of support member 24.

A removable handle member or grab bar 36 is provided to manipulate the device. In the flat-bed mode (FIG. 1), the handle 36 extends from the vertical sockets in three-way member 20. In the dolly mode (FIG. 2), handle 36 extends from the horizontal sockets in three-way member 20.

Figure 4:
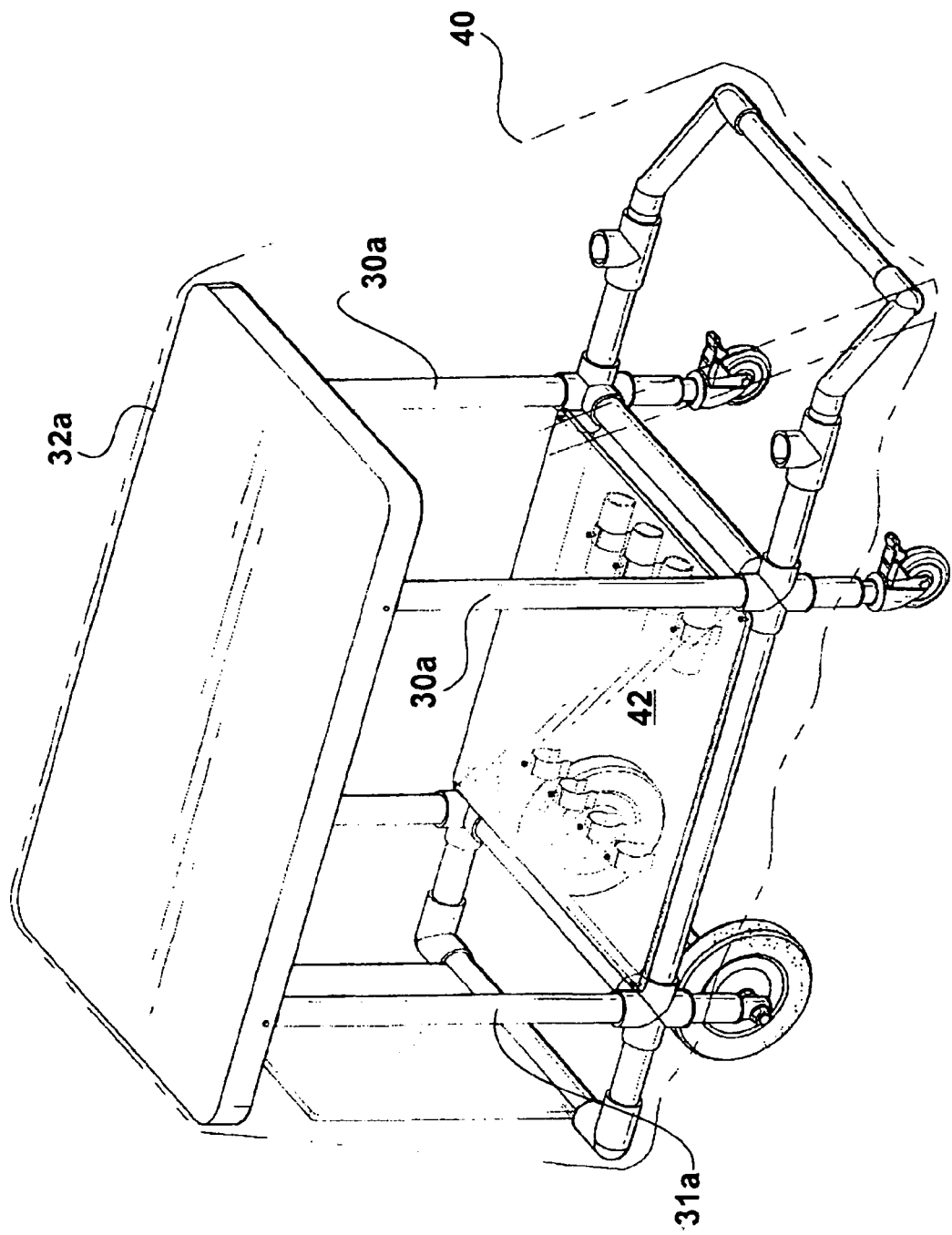
FIG. 4 is an environmental, perspective view of a convertible device utilized as a display table according to the present invention.

When employed as a table (FIG. 4), tubular members 30a are longer than corresponding members 30 so that the top of the table 32a can be supported at conventional table-top height. The recessed position of the wheels permits the table to be draped with a cover 40 (shown in phantom lines) without the wheels disrupting the lines of the cover. A shelf 42 can be provided for additional storage support surface. The legs and shelf are provided with conventional locking apparatus (not shown) to maximize stability.

Figure 5:
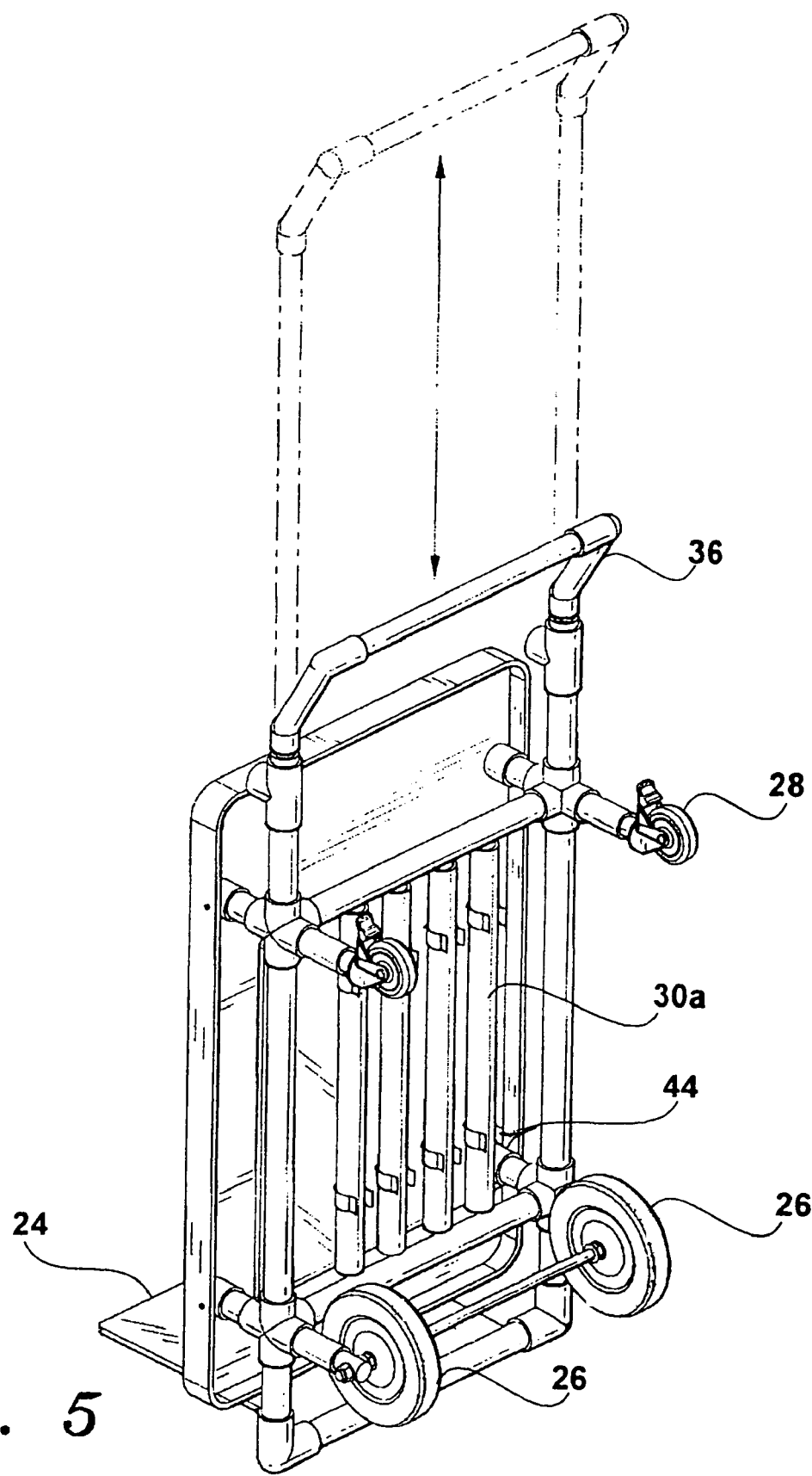
FIG. 5 is a partial view of a telescoping handle of a convertible device according to the present invention.

As best seen in FIG. 5, C-clamps 44 are employed to store tubular members 30a when the table mode is not in use. The handle 36 can be telescopically collapsed to a storage position if desired.

As contemplated, various components of the device will be fabricated from light-weight, rugged material that is resistant to harsh weather and rust such as high-density plastic and/or aluminum alloy. It should be noted, however, that any suitable materials or combinations thereof can be utilized. The device can be manufactured to the desired dimensional specifications of the potential user.

It is to be understood that the present invention is not limited to the embodiments described above, but encompasses any and all embodiments within the scope of the following claims.

I claim:

1. A convertible transporting device comprising:
   a frame member, said frame member having a front end and a rear end;
   a pair of pneumatic wheels, said pair of pneumatic wheels being attached to the rear end of said frame;
   a pair of soft rubber wheels, said pair of soft rubber wheels being attached to the front end of said frame;
   a handle member, said handle member being removably attached to said front end of said frame;
   a load support member removably attached to the rear end of said frame;
   a support bed member, said support bed member being removably mounted on said frame;
   a first pair of four-way socket members removably attached to said front end of said frame; and
   a pair of three-way socket members removably attached to said first pair of four-way socket members, wherein said handle member is removably attached to said pair of three-way socket members.

2. The convertible transporting device according to claim 1, further including releasable brakes mounted on said pair of soft rubber wheels.

3. The convertible transporting device according to claim 1, wherein said frame member is fabricated from a light-weight tubular material.

4. The convertible transporting device according to claim 1, wherein said frame has a perimeter and wherein said pair of pneumatic wheels and said pair of soft rubber wheels are slightly recessed inside the perimeter of said frame.

5. The convertible transporting device according to claim 1, wherein said handle member is telescopically attached to said front end of said frame.

6. The convertible transporting device according to claim 1, wherein a first array of tubular embers having a first length is employed to removably mount said support bed to said frame.

7. A convertible transporting device comprising:
   a frame member, said frame member having a front end, a rear end and a perimeter;
   a pair of pneumatic wheels, said pair of pneumatic wheels being attached to the rear end of said frame and slightly recessed inside the perimeter of the frame;
   a pair of soft rubber wheels, said pair of soft rubber wheels being attached to the front end of said frame and slightly recessed inside the perimeter of the frame;
   a handle member, said handle member being removably attached to said front end of said frame;
   a load support member removably attached to the rear end of said frame, said load support member having a planar surface;
   a support bed member, said support bed member being removably mounted on said frame, said support bed member having a planar surface;
   a first pair of four-way socket members removably attached to said front end of said frame; and
   a pair of three-way socket members removably attached to said first pair of four-way socket members, wherein said handle member is removably attached to said pair of three-way socket members.

8. The convertible transporting device according to claim 7, wherein said planar surface of said load support member is perpendicular to said planar surface of said support bed member.

9. The convertible transporting device according to claim 7, further including releasable brakes mounted on said pair of soft rubber wheels.

10. The convertible transporting device according to claim 7, wherein said frame member is fabricated from a light-weight tubular material.

11. The convertible transporting device according to claim 7, wherein said handle member is telescopically attached to said front end of said frame.

12. The convertible transporting device according to claim 7, wherein a first array of tubular members having a first length is employed to removably mount said support bed to said frame.

13. A convertible transporting device comprising:
   a frame member, said frame member having a front end, a rear end and a perimeter;
   a first pair of four-way socket members removably attached to said front end of said frame;
   a pair of three-way socket members removably attached to said first pair of four-way socket members;
   a second pair of four-way socket members removably attached to said rear end of said frame;
   a pair of pneumatic wheels, said pair of pneumatic wheels being removably attached to said second pair of four-way socket members and slightly recessed inside the perimeter of the frame;
   a pair of soft rubber wheels, said pair of soft rubber wheels being removably attached to said first pair of four-way socket members and slightly recessed inside the perimeter of the frame;
   a handle member, said handle member being removably attached to said pair of three-way socket members;
   a load support member removably attached to the rear end of said second pair of four-way socket members, said load support member having a planar surface; and
   a support bed member, said support bed member being removably mounted on said frame, said support bed member having a planar surface.

14. The convertible transporting device according to claim 13, wherein said frame member is fabricated from a light-weight tubular material.

15. The convertible transporting device according to claim 13, wherein said handle member is telescopically attached to said pair of three-way socket members.

16. The convertible transporting device according to claim 13, wherein a first array of tubular members having a first length is employed to removably mount said support bed to said frame at a first height.

17. The convertible transporting device according to claim 13, wherein a first array of tubular members having a first length is employed to removably mount said support bed to said frame at a first height above said frame and a second array of tubular members having a second length is employed in lieu of said first array to removably mount said support bed at a second height above said frame.

18. The convertible transporting device according to claim 17, wherein said second array of tubular members are stored beneath said support bed when not in use.

* * * * *